United States Patent
Ishii

(10) Patent No.: US 7,925,054 B2
(45) Date of Patent: Apr. 12, 2011

(54) MOTION DETECTION APPARATUS

(75) Inventor: Satoyuki Ishii, Kumagaya (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 780 days.

(21) Appl. No.: 11/963,459

(22) Filed: Dec. 21, 2007

(65) Prior Publication Data

US 2008/0226131 A1    Sep. 18, 2008

(30) Foreign Application Priority Data

Dec. 22, 2006  (JP) .................................. 2006-346210

(51) Int. Cl.
*G06K 9/00* (2006.01)
(52) U.S. Cl. ............ 382/107; 704/8; 382/106; 382/240; 348/669; 348/701; 345/204
(58) Field of Classification Search .................. 382/103, 382/106, 107, 199, 207, 240, 236, 263, 264; 348/558, 628, 701, 556, 913, 700, 413, 416, 348/441, 526; 375/240.12, 240.16, 240.19; 345/328, 333, 753, 726, 738; 704/8
See application file for complete search history.

(56) References Cited

U.S. PATENT DOCUMENTS

| | | | | | |
|---|---|---|---|---|---|
| 5,386,235 | A | * | 1/1995 | Ko | 348/427.1 |
| 5,940,141 | A | * | 8/1999 | Faroudja et al. | 348/628 |
| 5,973,749 | A | * | 10/1999 | Ishii et al. | 348/558 |
| 6,008,866 | A | * | 12/1999 | Komatsu | 348/701 |
| 6,774,954 | B1 | * | 8/2004 | Lee | 348/665 |

FOREIGN PATENT DOCUMENTS

| | | |
|---|---|---|
| JP | 3-220889 | 9/1991 |
| JP | 10-108039 | 4/1998 |

OTHER PUBLICATIONS esp@cenet patent abstract for Japanese Publication No. 3220889, Publication date Sep. 30, 1991 (1 page).
esp@cenet patent abstract for Japanese Publication No. 10108039, Publication date Apr. 24, 1998 (1 page).

* cited by examiner

*Primary Examiner* — Daniel G Mariam
*Assistant Examiner* — Nancy Bitar
(74) *Attorney, Agent, or Firm* — Osha • Liang LLP

(57) ABSTRACT

A motion detection apparatus which extracts a 1-frame differential signal from a video signal, separates the 1-frame differential signal into a vertical low frequency signal having a frequency which is lower than a predetermined frequency with respect to the vertical direction of a frame of the video signal and a vertical high frequency signal having a frequency which is equal to or higher than the predetermined frequency, separates, from the vertical low frequency signal and the vertical high frequency signal, signals having different frequency bands with respect to the horizontal direction of a frame of the video signal, respectively, and combines these separated signals.

9 Claims, 7 Drawing Sheets

400

MOTION DETECTION APPARATUS

CROSS-REFERENCE TO RELATED APPLICATIONS

The entire disclosure of Japanese Patent Application No. 20006-346210 filed on Dec. 22, 2006 including specification, claims, drawings, and abstract is incorporated herein by reference.

BACKGROUND

1. Technical Field

The present invention relates to a motion detection apparatus which detects motion at the time of separating a luminance signal and a chrominance signal from a video signal.

2. Related Art

For a color television signal of NTSC and PAL systems, a composite video signal in which a luminance signal and a chrominance signal are multiplexed is used. In order to apply Y/C separation processing, noise reduction processing, and so on, to the composite video signal, motion detection is performed. In a processing called motion-adaptive three-dimensional luminance/chrominance (Y/C) separation, when separating a luminance signal and a chrominance signal, two-dimensional Y/C separation utilizing correlation between horizontal lines and three-dimensional Y/C separation utilizing correlation between frames are switched from one to the other in accordance with a result of motion detection.

For example, motion detection processing, in which an edge is detected and the sensitivity of motion detection is decreased in a region which is determined to be an edge portion, thereby reducing erroneous detection of motion, is disclosed. In another technology, the precision in edge detection is increased by detecting an edge from each of an input signal and an output signal of a frame memory.

Here, a primary factor of erroneous detection of motion at an edge portion when detecting motion from a video signal is crosstalk of a luminance signal and a chrominance signal. For example, in the NTSC system, the phase of a luminance signal is identical between frames, whereas the phase of a chrominance signal is reversed in consecutive frames. As the phase of a chrominance signal is reversed between frames, an inter-frame differential signal includes a motion component and a color component. When a motion detection circuit determines this color component as motion, deficiencies including dot disturbance, cross color, image blur, and so on occur.

In the related art, the level of a motion signal supplied from a motion detection circuit is diminished in accordance with the level of an edge detection signal. The edge detection circuit extracts a change in frequency components associated with a change in a luminance signal and a chrominance signal by a band-pass filter, to thereby extract an edge component.

One problem of the related art is that it is difficult to detect an edge. First, while the signal level of a luminance signal is 100IRE at white peak, the maximum amplitude of a cyan bar and a red bar of a modulation chrominance signal is 63IRE. There is also a problem of a band-pass filter for edge detection. With regard to a design pattern of an image in which a chrominance signal changes in the horizontal direction, the frequency components of a modulation chrominance signal extend to low frequencies. With regard to a design pattern of an image in which a chrominance signal changes abruptly in the horizontal direction, there are cases where an edge cannot be detected unless the band of edge detection is expanded to low frequencies. Conversely, if the band of edge detection is extended to low frequencies to thereby increase the frequencies of edge detection, there is motion in an image and therefore edges of different design patterns in a current frame signal and a previous frame signal may overlap with each other. In this case, in spite of the fact that an image is moving, the presence of an edge is determined and the sensitivity of motion detection is decreased, causing a possibility that the image will not be determined as a moving image.

SUMMARY

In accordance with one aspect of the present invention, there is provided a motion detection apparatus which extracts a 1-frame differential signal from a video signal, separates, from the 1-frame differential signal, a vertical low frequency signal having a frequency which is lower than a predetermined frequency with respect to the vertical direction of a frame of the video signal and a vertical high frequency signal having a frequency which is equal to or higher than the predetermined frequency, separates signals having different frequency bands with respect to the horizontal direction of a frame of the video signal from the vertical low frequency signal and the vertical high frequency signal, respectively, and combines these separated signals.

BRIEF DESCRIPTION OF THE DRAWINGS

Preferred embodiments of the present invention will be described in detail based on the following figures, wherein.

DETAILED DESCRIPTION

Preferred embodiments of the present invention will be described in detail with reference to the accompanying drawings.

First Embodiment

Figure 1:
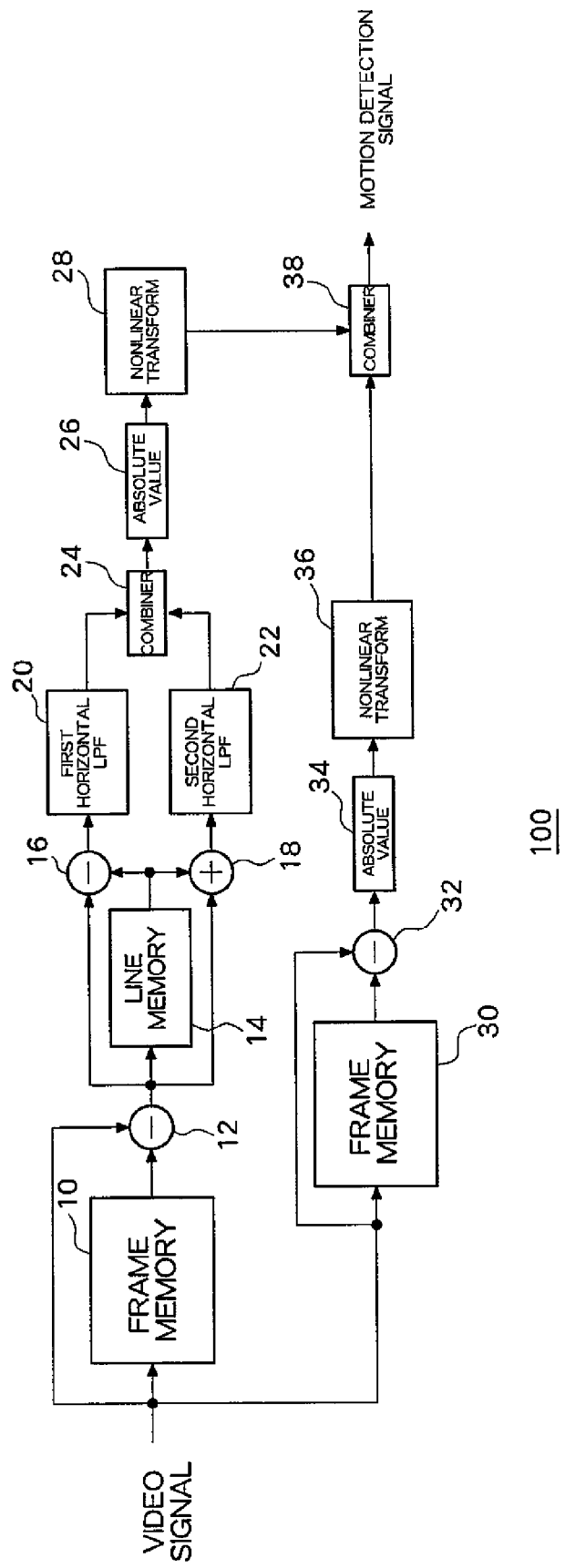
FIG. 1 is a view showing a structure of a motion detection apparatus according to a first embodiment of the present invention.

Referring to FIG. 1, a motion detection apparatus 100 according to a first embodiment includes a frame memory 10, a subtractor 12, a line memory 14, a subtractor 16, an adder 18, a first horizontal low-pass filter 20, a second horizontal low-pass filter 22, a combiner 24, an absolute value processing unit 26, a nonlinear transform unit 28, a frame memory 30, a subtractor 32, an absolute value processing unit 34, a nonlinear transform unit 36, and a combiner 38.

With a video signal being input to the frame memory 10, the subtractor 12, the frame memory 30, and the subtractor 32, the motion detection apparatus 100 detects and outputs motion included in the video signal. Each unit forming the motion detection apparatus 100 will be described.

The frame memory 10 delays the input video signal by one frame period and outputs the delayed video signal to the subtractor 12.

The subtractor 12 receives a video signal which is input from an external device and calculates a difference between the received video signal and the video signal which is delayed by one frame. The subtractor 12 then outputs the calculated difference to the line memory 14, the subtractor 16, and the adder 18, as a 1-frame differential signal. Because the phase of color sub-carrier is reversed for each frame in the NTSC system, the 1-frame differential signal includes a motion component and a chrominance signal component.

The line memory 14, receiving the 1-frame differential signal obtained by the subtractor 12, delays the 1-frame differential signal by one line and outputs the resulting signal to the subtractor 16 and the adder 18.

Figure 2:
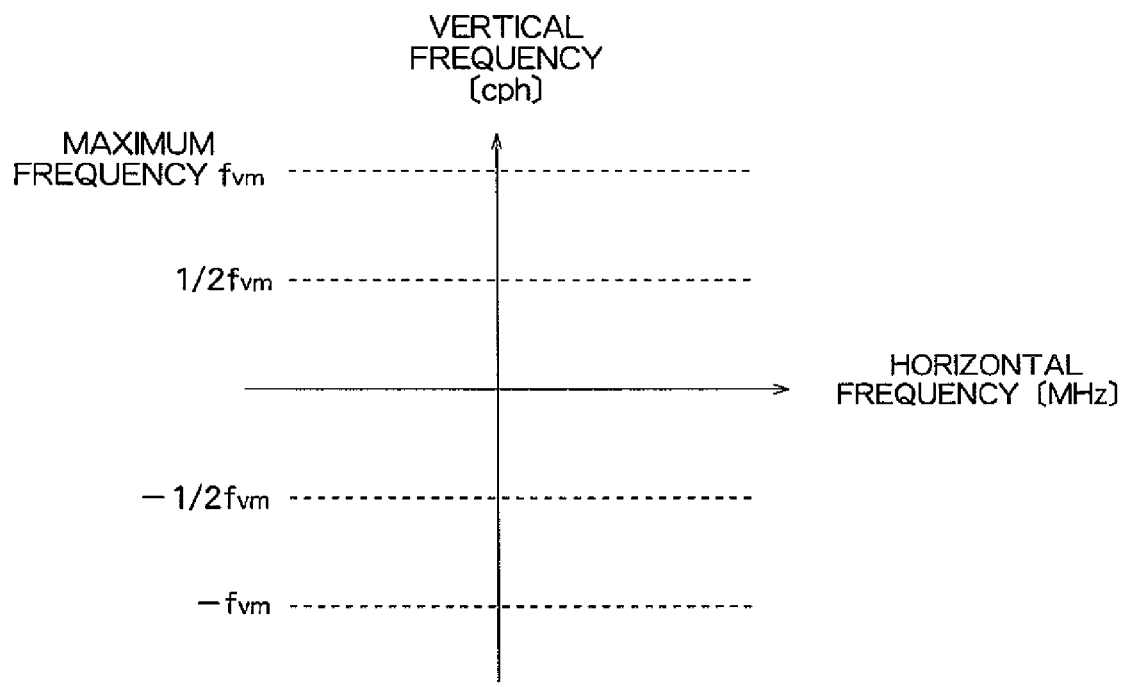
FIG. 2 is a view for explaining motion detection processing according to the embodiment of the present invention.

The subtractor 16 receives the 1-frame differential signal obtained by the subtractor 12 and the 1-frame differential signal which is delayed by one line in the line memory 14 and calculates a difference between these signals. The subtractor 16 then outputs the calculated difference to the first horizontal low-pass filter 20. More specifically, the subtractor 16 extracts a signal component in the frequency band with a predetermined frequency or higher in the vertical direction of the frame of the video signal (hereinafter referred to as a vertical high frequency component) and outputs the vertical high frequency component to the first horizontal low-pass filter 20. At this time, as shown in FIG. 2, the subtractor 16 extracts a signal component on the higher frequency side with respect to the frequency component output from the adder 18. More specifically, a signal component on the higher frequency side which is substantially ½ of the maximum frequency fvm or higher in the vertical direction is extracted.

The adder 18 receives the 1-frame differential signal obtained by the subtractor 12 and the 1-frame differential signal which is delayed by one line in the line memory 14 and calculates a sum of these signals. The adder 18 then outputs the calculated sum to the second horizontal low-pass filter 22. More specifically, the adder 18 extracts a signal component in the frequency band below a predetermined frequency in the vertical direction of the frame of the video signal (hereinafter referred to as a vertical low frequency component) and outputs the vertical low frequency component to the second horizontal low-pass filter 22. At this time, as shown in FIG. 2, the adder 18 extracts a signal component on the lower frequency side with respect to the frequency component output from the adder 16. More specifically, a signal component on the lower frequency side which is substantially below ½ of the maximum frequency fvm in the vertical direction is extracted.

The first horizontal low-pass filter 20 extracts, from the vertical high frequency component of the video signal extracted in the subtractor 16, a signal component in the frequency band with a first threshold frequency fh1 or lower in the horizontal direction of the frame of the video signal, and outputs the extracted signal component to the combiner 24. The second horizontal low-pass filter 22 extracts, from the vertical low frequency component of the video signal extracted in the adder 18, a signal component in the frequency band with a second threshold frequency fh2 or lower in the horizontal direction of the frame of the video signal, and outputs the extracted signal component to the combiner 24.

Here, the first threshold frequency fh1 is set lower than the second threshold frequency fh2. Specifically, as shown in FIG. 3, the first and second threshold frequencies fh1, fh2 are set such that the signal frequency component (horizontal frequency component) output from the second horizontal low-pass filter 22 is in a wider range than the signal frequency component (horizontal frequency component) output from the first horizontal low-pass filter 20.

More specifically, the second threshold frequency fh2 is preferably set such that a filter cutoff frequency is equal to or lower than the frequency of a carrier signal of a color component of the video signal (about 3.58 MHz in NTSC and about 4.43 MHz in PAL). Particularly, it is more preferable that the filter cutoff frequency of the second horizontal low-pass filter 22 is set to 1 MHz or lower. Further, it is also preferable that the first threshold frequency fh1 is set lower than the second threshold frequency fh2 and the filter cutoff frequency of the first horizontal low-pass filter 20 is set to 0.5 MHz or lower.

Figure 3:
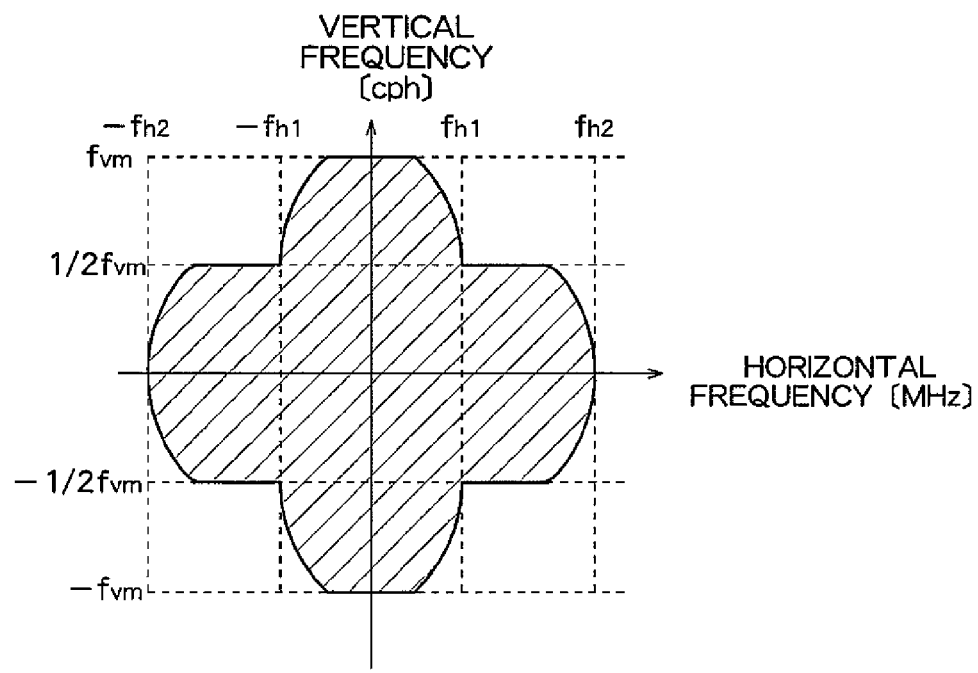
FIG. 3 is a view for explaining motion detection processing according to the embodiment of the present invention.

As described above, the motion detection apparatus 100 of the first embodiment performs a filtering processing such that a signal with a narrow horizontal frequency band is extracted with respect to a signal with the vertical high frequency region, and a signal with a wide horizontal frequency band is extracted with respect to a signal with the vertical low frequency region as shown in FIG. 3, by switching the horizontal low-pass filters to be applied, in accordance with the vertical frequency region contained in a signal.

The combiner 24 receives the signals output from the first horizontal low-pass filter 20 and the second horizontal low-pass filter 22 and combines these signals. The combiner 24 then outputs the combined signal. As such, the combiner 24 functions as a mixer circuit.

The absolute value processing unit 26 removes positive and negative polarities of the signal obtained in the combiner 24 and outputs a resultant signal to the nonlinear transform unit 28. The nonlinear transform unit 28 performs bit compression processing with respect to the signal which is processed in the absolute value processing unit 26. For example, the nonlinear transform unit 28 performs processing for transforming a signal represented by 8 bits into a signal represented by 3 bits, and so on.

The frame memory 30, receiving a video signal from an external device, stores and holds data of the video signal corresponding to two frames (two screens). Then, the frame memory 30, while storing the video signal corresponding to two frames, delays a stored video signal by two frame periods and outputs the delayed signal to the subtractor 32. As such, the frame memory 30 functions as a 2-frame delay circuit.

The subtractor 32 calculates a difference between a video signal externally input and the video signal which is delayed by two frame periods in the frame memory 30 and outputs the calculated difference to the absolute value processing unit 34 as a 2-frame differential signal. As, with regard to two signals having a two-frame distance between them, the phases of both luminance signals and chrominance signals are identical, the 2-frame differential signal includes a motion component of the luminance signals and the chrominance signals for two frames.

The absolute value processing unit 34 removes positive and negative polarities of the signal obtained in the subtractor 32 and outputs the resultant signal to the nonlinear transform unit 36. The nonlinear transform unit 36 performs bit compression processing with respect to the signal which is processed in the absolute value processing unit 34. Specifically, the nonlinear transform unit 36 performs processing for transforming a signal represented by 8 to 9 bits into a signal represented by 2 to 4 bits.

The combiner 38 combines the outputs from the nonlinear transform units 28 and 36 and outputs the combined signal as a motion detection signal. The motion detection signal includes a mixture of a luminance component signal and a color component signal, so that motion can be detected from either one of the component signals. In particular, as the signal output from the nonlinear transform unit 28 includes only a signal having a signal component in the frequency band in which an edge effective for motion detection is emphasized as shown in FIG. 3, it is possible to detect motion with a higher likelihood and a higher precision compared to the related art.

Second Embodiment

Figure 4:
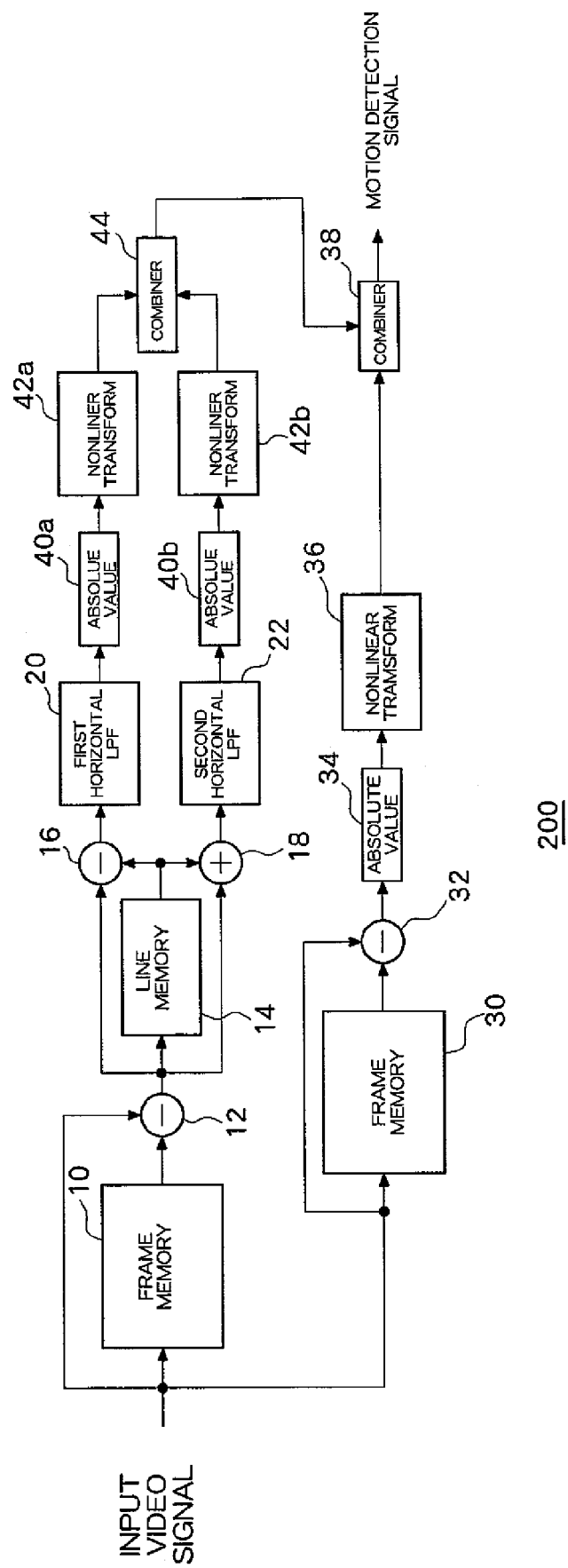
FIG. 4 is a view showing a structure of a motion detection apparatus according to a second embodiment of the present invention.

Referring to FIG. 4, a motion detection apparatus 200 according to a second embodiment includes a frame memory 10, a subtractor 12, a line memory 14, a subtractor 16, an adder 18, a first horizontal low-pass filter 20, a second horizontal low-pass filter 22, absolute value processing units 40a and 40b, nonlinear transform units 42a and 42b, a combiner 44, a frame memory 30, a subtractor 32, an absolute value processing unit 34, a nonlinear transform unit 36, and a combiner 38.

The elements of the motion detection apparatus 200 having the same functions as those of the corresponding elements of the motion detection apparatus 100 are designated by the same numerals and will not be described again.

The absolute value processing unit 40a removes positive and negative polarities of the signal output from the first horizontal low-pass filter 20 and outputs the resultant signal to the nonlinear transform unit 42a. The nonlinear transform unit 42a performs bit compression processing with respect to the signal processed in the absolute value processing unit 40a. The absolute value processing unit 40b removes positive and negative polarities of the signal output from the second horizontal-low-pass filter 22 and outputs the resultant signal to the nonlinear transform unit 42b. The nonlinear transform unit 42b performs bit compression processing with respect to the signal processed in the absolute value processing unit 40b.

The combiner 44 combines the signals output from the nonlinear transform units 42a and 42b and outputs the combined signal to the combiner 38. The combiner 38 then combines the signal output from the combiner 44 and the signal output from the nonlinear transform unit 36 and outputs the combined signal.

Figure 5:
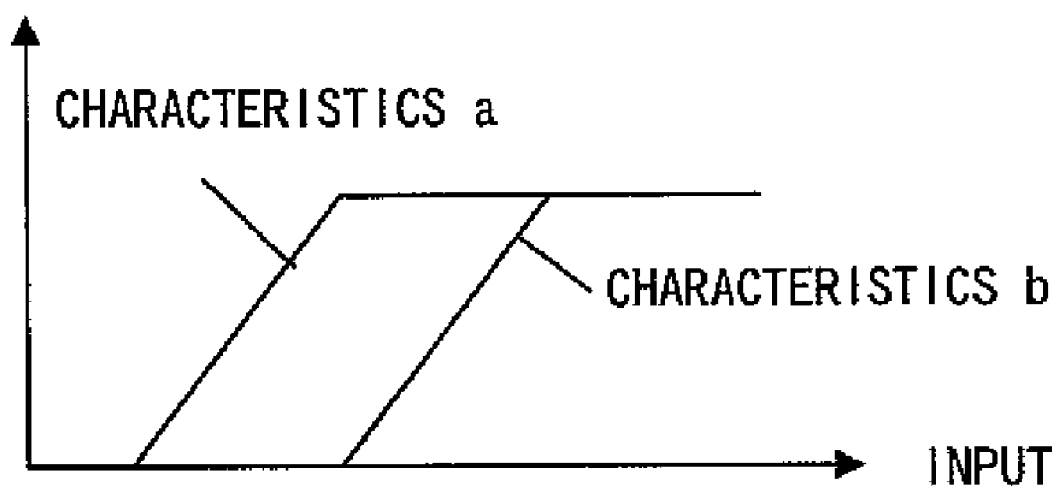
FIG. 5 is a view showing the characteristics of motion detection according to the second embodiment of the present invention.

As described above, according to the second embodiment, in which nonlinear transform processing is performed prior to combining the output signals from the first and second horizontal LPFs 20 and 22, the optimal nonlinear characteristics can be set in each of the vertical high frequency component and the vertical low frequency component of a 1-frame differential signal. Specifically, as the nonlinear transform unit 42a selects the characteristics b shown in FIG. 5, which are likely to be determined as a still image, effects of the color components contained in the 1-frame differential signal can be further reduced and accuracy in the motion detection can be increased.

Third Embodiment

Figure 6:
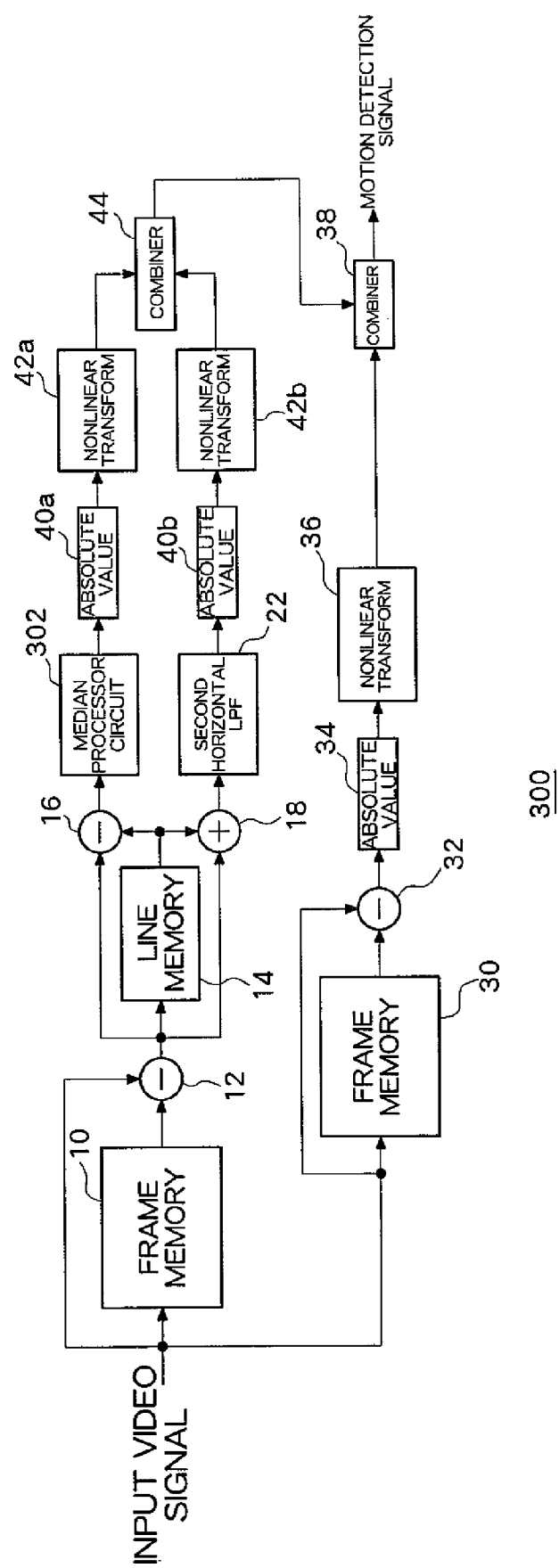
FIG. 6 is a view showing a structure of a motion detection apparatus according to a third embodiment of the present invention.

Referring to FIG. 6, a motion detection apparatus 300 according to a third embodiment includes a frame memory 10, a subtractor 12, a line memory 14, a subtractor 16, an adder 18, a second horizontal low-pass filter 22, a processing circuit 302, absolute value processing units 40a and 40b, nonlinear transform units 42a and 42b, a combiner 44, a frame memory 30, a subtractor 32, an absolute value processing unit 34, a nonlinear transform unit 36, and a combiner 38.

The elements of the motion detection apparatus 300 having the same functions as those of the corresponding elements of the motion detection apparatus 200 are designated by the same numerals and will not be described again. In the third embodiment, the processing circuit 302 is provided in place of the first horizontal low pass filter 20 of the motion detection apparatus 200.

Figure 7:
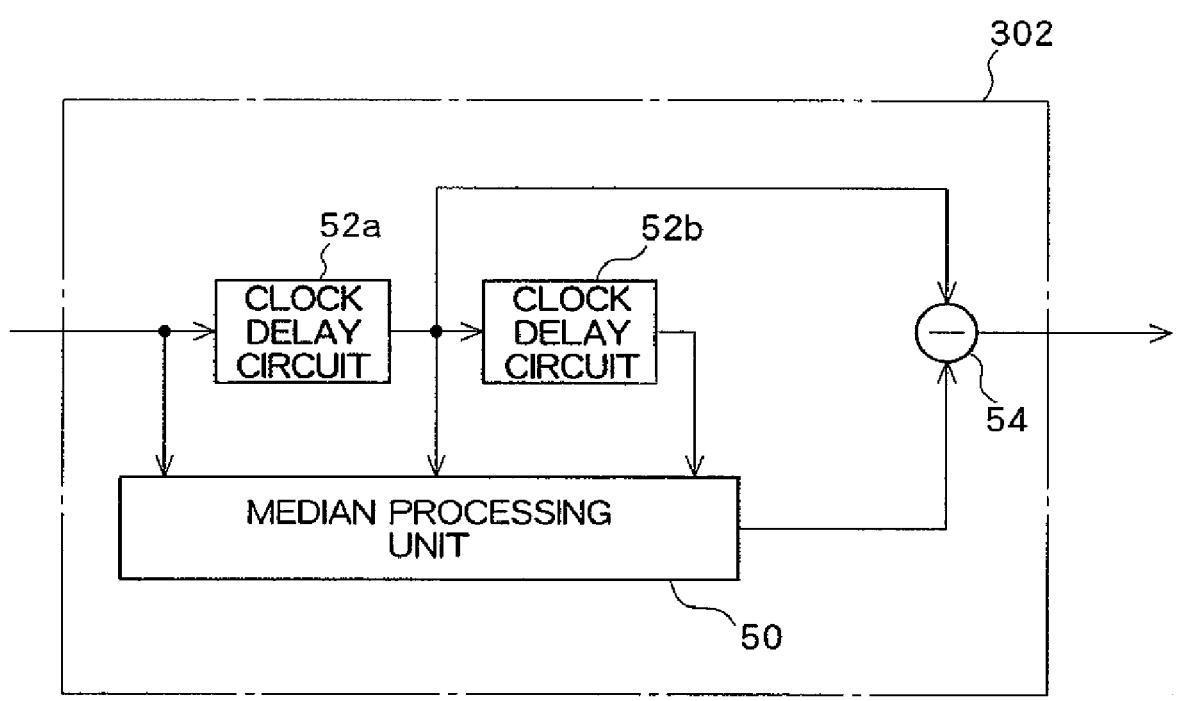
FIG. 7 is a view showing a basic structure of a processing circuit including a median processing unit.

Here, a case in which the processing circuit 302 is driven by a quadruple clock of a color sub-carrier will be described. As shown in FIG. 7, the processing circuit 302 can be formed by including a median processing unit 50, clock delay circuits 52a and 52b, and a subtractor 54. The clock delay circuits 52a and 52b operate as a 2-clock delay circuit. Specifically, the clock delay circuit 52a delays a signal received from the subtractor 16 by two clocks and outputs the delayed signal to the median processing unit 50, the clock delay circuit 52b, and the subtractor 54. Further, the clock delay circuit 52b delays the signal received from the clock delay circuit 52a by two clocks and outputs the delayed signal to the median processing unit 50.

The median processing unit 50, receiving the signals output from the clock delay circuits 52a and 52b, extracts a median of these signal values and outputs the median to the subtractor 54. Here, the clock delay circuits 52a and 52b are driven by a quadruple clock of the color sub-carrier, and pixels with a 2-clock distance are input to the median processing unit 50. The median processing unit 50 may receive signals via inverters (not shown), or the median processing unit 50 may include inverters (not shown). Pixels from the subtractor 16 and the clock delay circuit 52b are input to the median processing unit 50 (via the inverters). If the chrominance signal changes stepwise, an output signal from the median processing unit 50 is the signal output from clock delay circuit 52a.

The subtracter 54, receiving the output signals from the median processing unit 50 and the clock delay circuit 52a, calculates a difference of these signals and outputs the difference to the combiner 44. In the case of a design pattern in which the chrominance signal changes stepwise, the output signal from the median processing unit 50 and the output signal from the clock delay circuit 52a coincides with each other as described above, so that the chrominance signal components of these output signals cancel each other in the subtractor 54.

As described above, even when the first horizontal low pass filter 20 is changed to the processing circuit 302 having the median processing unit 50, the effects similar to those of the motion detection apparatus 200 can be obtained.

Figure 8:
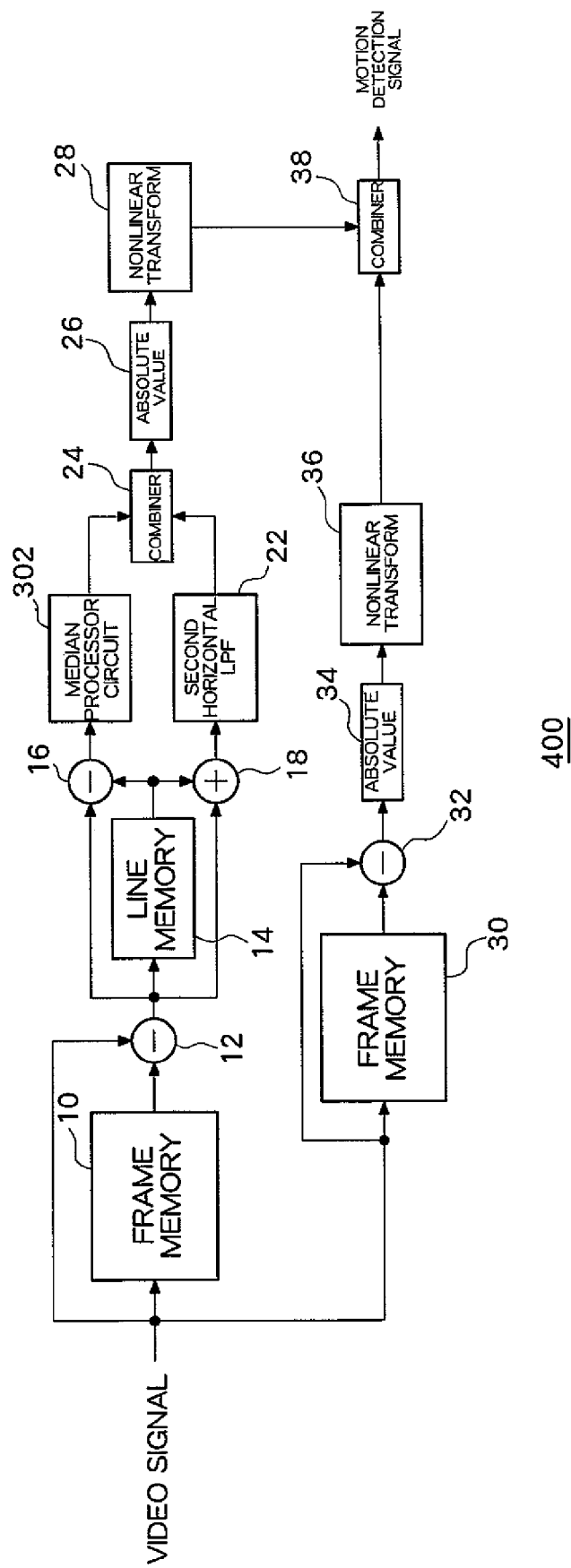
FIG. 8 is a view showing a structure of a motion detection apparatus according to a fourth embodiment of the present invention.

Similarly, as shown in a motion detection apparatus 400 of FIG. 8, the first horizontal low pass filter 20 in the motion detection apparatus 100 of the first embodiment may be replaced by the processing circuit 302 including the median processing unit 50.

While the preferred embodiments of the present invention have been described using specific terms, such description is for illustrative purposes only, and it is to be understood that changes and variations may be made without departing from the spirit or scope of the appended claims.

What is claimed is:
1. A motion detection apparatus, comprising:
a video signal;

a frame delay unit which delays the video signal by one frame;

a subtractor which outputs a difference between the video signal and the video signal which is delayed in the frame delay unit;

a first vertical frequency filter which separates and outputs, from a signal output from the subtractor, a predetermined frequency band with respect to a vertical direction of a frame of the video signal;

a second vertical frequency filter which separates and outputs, from a signal output from the subtractor, a frequency band which is lower than the predetermined frequency band of the first vertical frequency filter with respect to the vertical direction of a frame of the video signal;

a first horizontal low pass filter which separates and outputs, from a signal output from the first vertical frequency filter, a predetermined frequency band with respect to a horizontal direction of a frame of the video signal;

a second horizontal low pass filter which separates and outputs, from a signal output from the second vertical frequency filter, a frequency band which is broader than the predetermined frequency band of the first horizontal low pass filter with respect to the horizontal direction of a frame of the video signal;

and a combiner unit which combines the signal output from the first horizontal low pass filter and the signal output from the second horizontal low pass filter and outputs a combined signal.

2. A motion detection apparatus, comprising:

a video signal;

a frame delay unit which delays the video signal by one frame;

a subtractor which outputs a difference between the video signal and the video signal which is delayed in the frame delay circuit;

a first vertical frequency filter which separates and outputs, from a signal output from the subtractor, a predetermined frequency band with respect to a vertical direction of a frame of the video signal;

a second vertical frequency filter which separates and outputs, from a signal output from the subtractor, a frequency band, which is lower than the predetermined frequency band of the first vertical frequency filter with respect to the vertical direction of a frame of the video signal;

a first horizontal low pass filter which separates and outputs, from a signal output from the first vertical frequency filter, a predetermined frequency band with respect to a horizontal direction of a frame of the video signal;

a second horizontal low pass filter which separates and outputs, from a signal output from the second vertical frequency filter, a frequency band which is broader than the frequency band of the first horizontal low pass filter with respect to the horizontal direction of a frame of the video signal;

a first nonlinear transform unit which nonlinearly transforms the signal output from the first horizontal low pass filter;

a second nonlinear transform unit which nonlinearly transforms the signal output from the second horizontal low pass filter;

and a combiner unit which combines the signal output from the first nonlinear transform unit and the signal output from the second nonlinear transform unit and outputs a combined signal.

3. The motion detection apparatus according to claim 1, wherein
the first horizontal low pass filter includes a median processing unit.

4. The motion detection apparatus according to claim 2, wherein
the first horizontal low pass filter includes a median processing unit.

5. The motion detection apparatus according to claim 1, wherein
the second horizontal low pass filter has a passband of 1 MHz or less.

6. The motion detection apparatus according to claim 2, wherein
the second horizontal low pass filter has a passband of 1 MHz or less.

7. The motion detection apparatus according to claim 1, wherein
the first horizontal low pass filter has a passband of 0.5 MHz or less.

8. The motion detection apparatus according to claim 2, wherein
the first horizontal low pass filter has a passband of 0.5 MHz or less.

9. A motion detection apparatus, according to claim 1 further comprising:

a 1-frame differential signal is extracted from the video signal;

a vertical low frequency signal having a frequency which is lower than a predetermined frequency with respect to the vertical direction of a frame of the video signal;

and a vertical high frequency signal having a frequency which is equal to or higher than the predetermined frequency are separated from the 1-frame differential signal;

signals having different frequency bands with respect to the horizontal direction of a frame of the video signal are separated from the vertical low frequency signal and the vertical high frequency signal, respectively;

and a signal which is separated from the vertical high frequency signal and a signal which is separated from the vertical low frequency signal are combined.

* * * * *